United States Patent [19]

Yoshinaka et al.

[11] Patent Number: 4,711,136

[45] Date of Patent: Dec. 8, 1987

[54] POWER TRANSFER DEVICE FOR FOUR-WHEEL DRIVE

[75] Inventors: Toshio Yoshinaka; Toshikatsu Taniguchi; Shuichiro Ida; Shuji Nagano; Shigeru Kimura; Yasuo Tanaka, all of Toyota, Japan

[73] Assignee: Toyota Jidosha Kabushiki Kaisha, Aichi, Japan

[21] Appl. No.: 837,268

[22] Filed: Mar. 7, 1986

[30] Foreign Application Priority Data

Mar. 12, 1985 [JP] Japan .................. 60-48920

[51] Int. Cl.⁴ .................. F16H 37/06; B60K 23/08
[52] U.S. Cl. .................. 74/665 GA; 74/665 GE; 74/705; 180/247
[58] Field of Search .................. 74/740, 665 F, 665 G, 74/665 GA, 665 GE, 674, 705, 339; 180/247

[56] References Cited

U.S. PATENT DOCUMENTS

| | | | |
|---|---|---|---|
| 2,017,101 | 10/1935 | Lapsley | 74/473 R |
| 2,479,838 | 8/1949 | Huston | 74/665 GA X |
| 2,887,201 | 5/1959 | Willis | 192/67 |
| 2,968,190 | 1/1961 | Orr | 74/467 |
| 2,984,122 | 5/1961 | Woolley | 74/606 |
| 3,097,546 | 7/1963 | Kelbel et al. | 74/788 |
| 3,131,582 | 5/1964 | Kelbel | 74/788 |
| 3,221,574 | 12/1965 | Sampietro et al. | 74/665 GA |
| 3,310,992 | 3/1967 | Stott | 74/473 R |
| 3,431,791 | 3/1969 | Labat | 74/473 R |
| 3,442,346 | 5/1969 | Winter et al. | 180/247 X |
| 3,627,072 | 12/1971 | Smirl | 180/44 |
| 3,788,164 | 1/1974 | Ojima | 74/665 T |
| 3,935,752 | 2/1976 | Kelbel et al. | 74/473 R |
| 3,955,442 | 5/1976 | Kessmar | 74/665 GE |
| 4,048,870 | 9/1977 | Hulsebusch | 74/473 R |
| 4,103,753 | 8/1978 | Holdeman | 180/247 |
| 4,138,906 | 2/1979 | Nakao et al. | 74/674 |
| 4,197,760 | 4/1980 | Wolfe | 74/477 |
| 4,270,409 | 6/1981 | Glaze et al. | 74/665 GA |
| 4,290,318 | 9/1981 | Ookubo et al. | 74/477 |
| 4,292,860 | 10/1981 | Kako et al. | 74/665 GA |
| 4,297,910 | 11/1981 | Myers | 74/473 R |
| 4,298,085 | 11/1981 | Moroto et al. | 180/247 |
| 4,299,140 | 11/1981 | Kako et al. | 74/665 G |
| 4,305,309 | 12/1981 | Ookubo et al. | 74/477 |
| 4,373,604 | 2/1983 | Lunn et al. | 180/247 |
| 4,381,828 | 5/1983 | Lunn et al. | 180/247 |
| 4,404,869 | 9/1983 | Numazawa et al. | 74/740 |
| 4,422,349 | 12/1983 | Matsumoto et al. | 74/665 GE |
| 4,440,042 | 4/1984 | Holdeman | 74/785 |
| 4,452,331 | 6/1984 | Lunn et al. | 180/247 |
| 4,458,557 | 7/1984 | Hayakawa | 74/665 GE |
| 4,476,952 | 10/1984 | Suzuki | 180/247 |
| 4,476,956 | 10/1984 | Hiraiwa | 180/247 X |
| 4,503,927 | 3/1985 | Hayakawa et al. | 180/247 |
| 4,541,503 | 9/1985 | Akutagawa et al. | 180/247 X |
| 4,559,846 | 12/1985 | Cochran et al. | 180/247 X |
| 4,577,524 | 3/1986 | Richards et al. | 74/411.5 |
| 4,582,159 | 4/1986 | Suzuki | 180/247 |

FOREIGN PATENT DOCUMENTS

| | | |
|---|---|---|
| 169361 | 3/1951 | Austria . |
| 0022632 | 1/1981 | European Pat. Off. . |
| 2515765 | 5/1983 | France . |
| 53-21642 | 3/1952 | Japan . |
| 0949029 | 2/1964 | United Kingdom .......... 74/665 GA |
| 1291257 | 10/1972 | United Kingdom .................. 74/467 |
| 2103735 | 2/1983 | United Kingdom . |

Primary Examiner—Leslie Braun
Assistant Examiner—Martin G. Belisario
Attorney, Agent, or Firm—Parkhurst & Oliff

[57] ABSTRACT

In combination with a power transmission, a power transfer device comprises a first shaft rotatably mounted within a housing and having an input end for connection to an output shaft of the transmission and an output end for drive connection to a pair of rear-wheel axles, a second shaft rotatably mounted within the housing in parallel with the first shaft for drive connection to a pair of front-wheel axles, a drive gear rotatably mounted on the first shaft and connectable to the first shaft, a driven gear rotatably mounted on the second shaft and connectable to the second shaft, the driven gear being drivingly connected to the drive gear, and a pair of sleeves each mounted on the first and second shafts and shiftable between a first position where both the clutch sleeves are retained to connect the drive and driven gears to the first and second shafts and a second position where both the clutch sleeves are retained to disconnect the drive and driven gears from the first and second shafts, whereby both the drive and driven gears are stilled when two wheel drive is selected at the transfer device.

11 Claims, 2 Drawing Figures

POWER TRANSFER DEVICE FOR FOUR-WHEEL DRIVE

BACKGROUND OF THE INVENTION

1. Field of the Invention

The present invention relates to a power transfer device adapted for use in combination with a power transmission for a four-wheel drive vehicle to selectively transfer output drive torque from the power transmission to a pair of front-wheel axles and/or a pair of rear-wheel axles, and more particularly to a power transfer device capable of selectively providing either a low speed four-wheel drive, a high speed four-wheel drive or a high speed two-wheel drive.

2. Discussion of the Background

In Japanese Utility Model Early Publication No. 53-121642, there has been proposed a power transfer device of this kind which comprises a first shaft rotatably mounted within a housing and having an input end for connection to an output shaft of a power transmission and an output end for drive connection to a pair of rear-wheel or front-wheel axles, a second shaft rotatably mounted within the housing in parallel with the first shaft for drive connection to a pair of front-wheel or rear-wheel axles, a drive gear mounted on the first shaft, and a driven gear mounted on the second shaft and drivingly connected to the drive gear. In such a conventional power transfer device, the drive gear is rotatably mounted on the first shaft and connectable to the first shaft by means of a changeover mechanism such as a clutch in the transfer device, while the driven gear is fixedly mounted on the second shaft for rotation therewith. Alternatively, the drive gear is fixedly mounted on the first shaft for rotation therewith, while the driven gear is rotatably mounted on the second shaft and connectable to the second shaft by means of a changeover mechanism such as a clutch in the transfer device.

To select two-wheel drive at the power transfer device, the changeover mechanism is conditioned to disconnect the drive gear from the first shaft or the driven gear from the second shaft. During travel of the vehicle in such a two-wheel drive mode, the non-driven wheels act to drive the drive line components between the non-driven wheels and the changeover mechanism in the transfer device. This causes various problems such as temperature-rise of lubricating oil in the transfer device, wear of the components, power consumption, unpleasant gear noises and the like. Although such problems can be solved by the use of manual or automatic hub locks at each non-driven wheel to disconnect the wheel from its associated split axle part when the two-wheel drive is selected at the transfer device, the hub locks are either inconvenient to operate or expensive and complicated. Additionally, if the driver forgets to unlock the manual hub locks in the two-wheel drive mode of the vehicle, the forgoing problems may not be avoided.

SUMMARY OF THE INVENTION

It is, therefore, a primary object of the present invention to provide an improved power transfer device wherein both the drive and driven gears on the first and second shafts can be stilled when the vehicle is in the two-wheel drive mode.

Another object of the present invention is to provide an improved power transfer device capable of preventing temperature-rise of lubricating oil in the transfer device during high speed travel of the vehicle in the two-wheel drive mode and capable of reducing wear of the components and power consumption.

According to the present invention, the foregoing objects are accomplished by providing a power transfer device adapted for use in combination with a power transmission for an automotive vehicle, which transfer device comprises a housing, a first shaft rotatably mounted within the housing and having an input end for connection to an output shaft of the power transmission and an output end for drive connection to a pair of rear-wheel or front-wheel axles, a second shaft rotatably mounted within the housing in parallel with the first shaft and having an output end for drive connection to a pair of front-wheel or rear-wheel axles, a drive gear rotatably mounted on the first shaft and connectable to the first shaft, a driven gear rotatably mounted on the second shaft and connectable to the second shaft, the driven gear being drivingly connected to the drive gear, and a changeover mechanism including a pair of clutch sleeves each mounted on the first and second shafts and shiftable between a first position where both the clutch sleeves are retained to connect the drive and driven gears to the first and second shafts respectively and a second position where both the clutch sleeves are retained to disconnect the drive and driven gears from the first and second shafts respectively.

In the actual practice of the present invention, the power transfer device comprises a housing, an input shaft rotatably mounted within the housing for connection to an output shaft of the power transmission, a first output shaft rotatably mounted within the housing coaxially with the input shaft, the first output shaft having an inner end rotatably coupled within the input shaft and an output end for drive connection to a pair of rear-wheel or front-wheel axles, a second output shaft rotatably mounted within the housing in parallel with the first output shaft and having an output end for drive connection to a pair of front-wheel or rear-wheel axles, a drive gear rotatably mounted on the first output shaft and connectable to the first output shaft, and a driven gear rotatably mounted on the second output shaft and connectable to the second output shaft, the driven gear being drivingly connected to the drive gear. The power transfer device further comprises a change-speed mechanism mounted on the input shaft and having an input element connected with the input shaft and an output element for providing a low speed drive power train, a first changeover mechanism including a clutch sleeve mounted on the first output shaft between the change-speed mechanism and the drive gear and shiftable between a first position where the clutch sleeve is retained to directly connect the input shaft to the first output shaft and a second position where the clutch sleeve is retained to connect the output element of the change-speed mechanism to the first output shaft, and a second changeover mechanism including a pair of second clutch sleeves each mounted on the first and second output shafts and shiftable between a first position where both the second clutch sleeves are retained to connect the drive and driven gears to the first and second output shafts respectively and a second position where both the second clutch sleeves are retained to disconnect the drive and driven gears from the first and second output shafts respectively.

BRIEF DESCRIPTION OF THE DRAWING

Additional objects, features and advantages of the present invention will be apparent and understood from the following detailed description of a preferred embodiment thereof when taken in connection with the accompanying drawing, in which.

DETAILED DESCRIPTION OF THE PREFERRED EMBODIMENT

Figure 1:
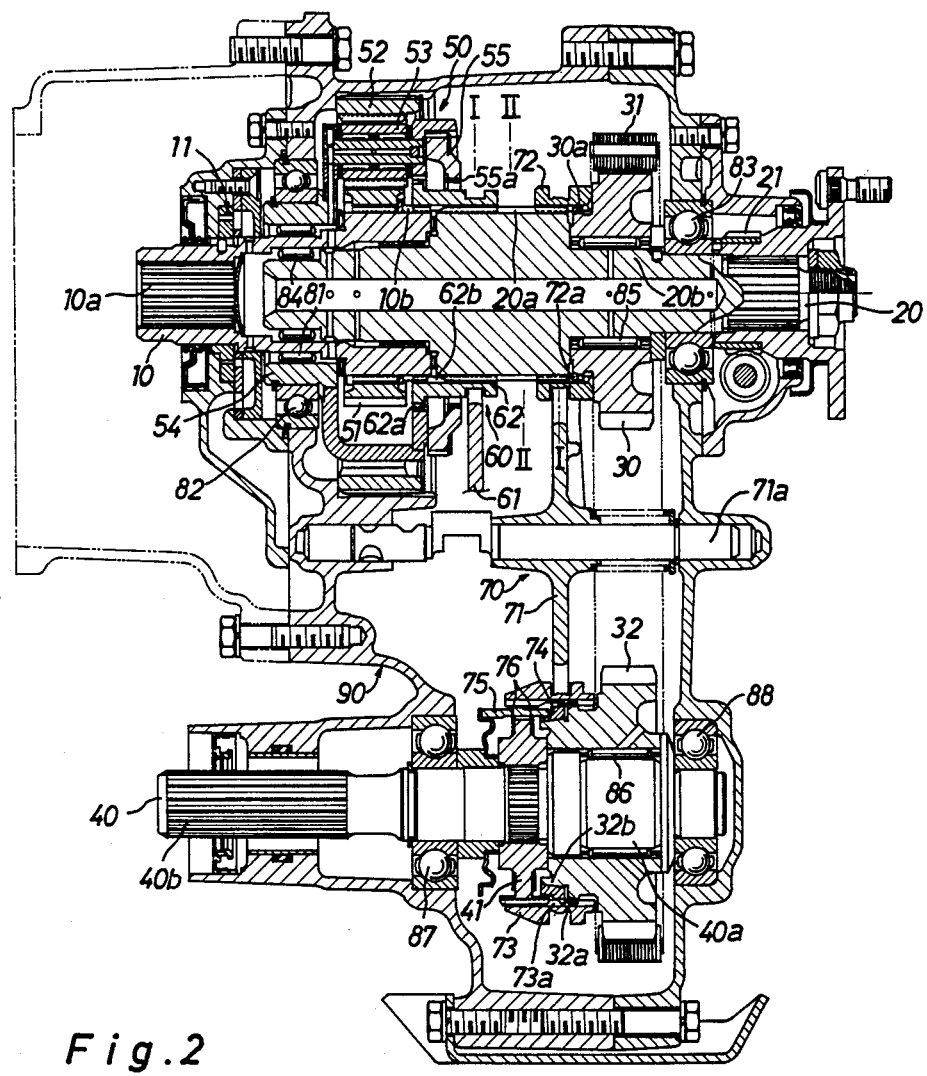
FIG. 1 is a full sectional view of a power transfer device in accordance with the present invention.

In FIG. 1 of the drawing, there is illustrated a power transfer device for part-time four wheel drive in accordance with the present invention, which transfer device includes, as main components, an input shaft 10, a first output shaft 20, a drive sprocket 30, a drive chain 31, a driven sprocket 32, a second output shaft 40, a planetary gear unit 50, a first changeover mechanism 60, and a second changeover mechanism 70. The input shaft 10 has an internally splined portion 10a for connection to an output shaft of a power transmission (not shown) for an automotive vehicle and has an externally splined portion 10b for mounting the planetary gear unit 50 thereon. The input shaft 10 is rotatably mounted on a left-hand side wall of a transfer housing 90 through a needle bearing 81, a carrier 54 of the planetary gear unit 50 and a ball bearing 82. An oil pump 11 is mounted on the outer end portion of input shaft 10 to supply lubricating oil to bearing portions and intermeshed portions in the transfer device.

The first output shaft 20 has an externally splined hub portion 20a and a journal portion 20b and is arranged coaxially with the input shaft 10 for drive connection to a pair of rear-wheel axles (not shown). The first output shaft 20 is rotatably mounted on a right-hand side wall of the transfer housing 90 through a ball bearing 83 and has an inner end portion coupled within the inner end portion of input shaft 10 through a needle bearing 84 for relative rotation. A drive gear 21 for a speedometer is fixedly mounted on the outer end portion of the first output shaft 20. The drive sprocket 30 is rotatably mounted on the journal portion 20b of first output shaft 20 through a needle bearing 85 and is drivingly connected to the driven sprocket 32 by means of the drive chain 31. The driven sprocket 32 is rotatably mounted on a journal portion 40a of the second ouput shaft 40 through a needle bearing 86. The second output shaft 40 is arranged in parallel with the input and output shafts 10 and 20 and rotatably supported by a pair of axially spaced ball bearings 87 and 88 mounted within the transfer housing 90. The second output shaft 40 has an externally splined portion 40b for drive connection to a pair of front-wheel axles.

The planetary gear unit 50 is adapted as a change-speed mechanism for the transfer device which comprises a sun gear 51 mounted in place on the externally splined portion 10b of input shaft 10 for rotation therewith, a stationary ring gear 52 arranged concentrically with the sun gear 51 and splined to an internal cylindrical wall of housing 90, and a plurality of planetary gears 53 rotatably supported by the carrier 54 and in mesh with the sun gear 51 and the ring gear 52. An annular gear plate 55 is fixed to the right end of carrier 54 for rotation therewith and is formed with internal spline teeth 55a which are arranged to be engaged with external spline teeth 62a of an internally splined clutch sleeve 62. When the clutch sleeve 62 is axially moved to engage the internal spline teeth 55a of gear plate 55 at its external spline teeth 62a, the planetary gear unit 50 acts to transfer drive torque from the input shaft 10 to the first output shaft 20 therethrough at a predetermined reduction speed ratio.

Figure 2:
FIG. 2 illustrates a shift pattern of a manually operated transfer lever adapted to the transfer device.

The first changeover mechanism 60 includes a first shift fork 61 which is coupled with the clutch sleeve 62. The shift fork 61 is operatively connected to a single transfer lever (not shown) which is arranged in the vehicle compartment to be shifted by the driver. In FIG. 2 there is illustrated a shift pattern of the transfer lever, wherein the characters $L_4$ and $H_4$ each indicate low and high speed positions for four wheel drive, and the character $H_2$ cates a high speed position for two wheel drive. The transfer lever is selectively retained in the respective speed positions $L_4$, $H_4$ and $H_2$ by means of a detent mechanism (not shown) mounted within the transfer device. When the transfer lever is retained in the high speed position $H_4$ for four-wheel drive, the shift fork 61 is positioned to retain the clutch sleeve 62 in a first position I. When the transfer lever is shifted from the high speed position $H_4$ to the low speed position $L_4$ for four-wheel drive, the shift fork 61 is shifted to retain the clutch sleeve 62 in a second position II.

The clutch sleeve 62 has internal spline teeth 62b axially slidably engaged with the externally splined portion 10b of input shaft 10 and the externally splined hub portion 20a of first output shaft 20. When retained in the first position I, the clutch sleeve 62 is disengaged from the internal spline teeth 55a of gear plate 55 and is in engagement with the external splined portion 10b of input shaft 10 to effect direct connection between the input and output shafts 10 and 20. When shifted to the second position II, the clutch sleeve 62 is disengaged from the externally splined portion 10b of input shaft 10 and engaged with the internal spline teeth 55a of gear plate 55 at its external spline teeth 62a to drivingly connect the input shaft 10 to the first output shaft 20 through the planetary gear unit 50.

The second changeover mechanism 70 includes a second shift fork 71 which is coupled at the opposite ends thereof with a pair of internally splined clutch sleeves 72 and 73. The second shift fork 71 is carried at its base portion on a spring loaded slide rod 71a which is axially slidably mounted within the housing 90. The second shift fork 71 is operatively connected to the transfer lever to be moved as described below. When the transfer lever is retained in the high speed position $H_4$ for four-wheel drive, the second shift fork 71 is positioned to retain both the clutch sleeves 72 and 73 in their first positions I. When the transfer lever is shifted from the high speed position $H_4$ to the high speed position $H_2$ for two-wheel drive, the second shift fork 71 is shifted to retain both the clutch sleeves 72 and 73 in their second positions II.

The clutch sleeve 72 has internal spline teeth 72a axially slidably engaged with the externally splined hub portion 20a of first output shaft 20 to be brought into engagement with external spline teeth 30a formed on the left end hub portion of drive sprocket 30. When retained in the first position I, the clutch sleeve 72 is in engagement with the external spline teeth 30a of drive sprocket 30 to rotate the drive sprocket 30 with the first output shaft 20. When shifted to and retained in the second position II, the clutch sleeve 72 is disengaged from the external spline teeth 30a of drive sprocket 30 to disconnect the drive sprocket 30 from the first output shaft 20. Similar to the clutch sleeve 72, the clutch sleeve 73 has internal spline teeth 73a axially slidably engaged with external spline teeth of a hub member 41 to be brought into engagement with external spline teeth 32a formed on the left end hub portion of driven sprocket 32. The hub member 41 is splined to the second output shaft 40 for rotation therewith. When retained in the first position I, the clutch sleeve 73 is in engagement with the external spline teeth 32a of driven sprocket 32 to rotate the driven sprocket 32 with the second output shaft 40. When shifted to and retained in the second position II, the clutch sleeve 73 is disengaged from the external spline teeth 32a of driven sprocket 32 to disconnect the driven sprocket 32 from the second output shaft 40.

In this embodiment, the clutch sleeve 73 is provided with a well known synchronizer mechanism which includes a synchronizer ring 74 rotatably and axially slidably mounted on a conical portion 32b of driven sprocket 32, a plurality of circumferentially spaced strut keys 75 mounted on the hub member 41 for engagement with the clutch sleeve 73, and a pair of annular springs 76 in engagement with the strut keys 75. In shifting operation of the second shift fork 71 from the second position II to the first position I, the synchronizer mechanism acts to effect synchronous connection between the driven sprocket 32 and the second output shaft 40 prior to engagement of the clutch sleeve 72 with the external spline teeth 30a of drive sprocket 30.

Hereinafter, operation of the power transfer device will be described with reference to FIGS. 1 and 2. Assuming that the transfer lever is retained in the high speed position $H_4$ for four-wheel drive, the clutch sleeve 62 is retained by the first shift fork 61 in the first position I, while both the clutch sleeves 72 and 73 are retained by the second shift fork 71 in their first positions I. In this condition, the clutch sleeve 62 acts to effect direct connection between the input and output shafts 10 and 20, while the clutch sleeves 72 and 73 each act to connect the drive sprocket 30 to the first output shaft 20 and to connect the driven sprocket 32 to the second output shaft 40. Thus, the first output shaft 20 is drivingly connected to the second output shaft 40 through the drive chain 31 to transfer the output drive torque from the power transmission to the front and rear wheel axles therethrough thereby to provide a high speed four-wheel drive.

When the transfer lever is shifted from the high speed position $H_4$ to the high speed position $H_2$ for two-wheel drive, the second shift fork 71 is moved to shift both the clutch sleeves 72 and 73 to their second positions II and retain them in place. In such a condition, the clutch sleeve 72 is disengaged from the external spline teeth 30a of drive sprocket 30 to permit free rotation of the first output shaft 20 with respect to the drive sprocket 30, and the clutch sleeve 73 is disengaged from the external spline teeth 32a of driven sprocket 32 to permit free rotation of the second output shaft 40 with respect to the driven sprocket 32. Thus, the first output shaft 20 is disconnected from the second output shaft 40 to drive only the rear-wheel axles thereby to provide a high speed two-wheel drive. When the transfer lever is shifted from the high speed position $H_4$ to the low speed postion $L_4$ for four-wheel drive, the first shift fork 61 is moved to shift the clutch sleeve 62 to the second position II and retain it in place. In this condition, the clutch sleeve 62 is disengaged from the externally splined portion 10b of input shaft 10 and engaged with the internal spline teeth 55a of gear plate 55 at its external spline teeth 62a to rotate the first output shaft 20 with the gear plate 55. Thus, the planetary gear unit 50 acts to transfer the output drive torque from the input shaft 10 to the first output shaft 20 therethrough at the predetermined reduction speed ratio thereby to provide a low speed four-wheel drive.

From the above description, it will be understood that during travel of the vehicle in the high speed two-wheel drive mode, both the clutch sleeves 72 and 73 are retained in their second positions II to disconnect the drive and driven sprockets 30 and 32 from the first and second output shafts 20 and 40, respectively. This is effective to still both the drive and driven sprockets 30 and 32 on the respective output shafts 20 and 40 so as to prevent back drive to the chain and sprocket assembly 30, 31 and 32 when the vehicle is in the high speed two-wheel drive mode. It is, therefore, able to reduce wear and power consumption caused by rotation of the chain and sprocket assembly during high speed travel of the vehicle in the two-wheel drive mode. Furthermore, in the power transfer device, only the clutch sleeve 62 is shifted to selectively provide the high speed four-wheel drive or the low speed four-wheel drive, and the clutch sleeves 72, 73 are shifted only to selectively provide the high speed four-wheel drive or the high speed two-wheel drive. This means that the second position II of clutch sleeve 62 is commonly utilized with the second position II of clutch sleeve 72 to minimize the axial space for movements of the clutch sleeves 62 and 72.

Although in the above embodiment, the present invention has been adapted to a power transfer device of the type in which the drive chain 31 is adapted to drivingly connect the drive sprocket 30 to the driven sprocket 32, the invention may be adapted to a power transfer device of the type in which an intermediate gear is arranged to drivingly connect the drive and driven sprockets 30 and 32 to each other. Furthermore, the synchronizer mechanism between the driven sprocket 32 and the second output shaft 40 may be substituted for a sychronizer mechanism between the drive sprocket 30 and the first output shaft 20.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device adapted for use in combination with a power transmission for an automotive vehicle, comprising:
   a housing;
   a first shaft rotatably mounted within said housing and having an input end for connection to an output shaft of said power transmission and an output end for drive connection to a pair of rear-wheel or front-wheel axles of the vehicle;
   a second shaft rotatably mounted within said housing in parallel with said first shaft and having an output end for drive connection to a pair of front-wheel or rear-wheel axles of the vehicle;

a drive gear rotatably mounted on said first shaft and connectable to said first shaft;

a driven gear rotatably mounted on said second shaft and connectable to said second shaft, said driven gear being drivingly connected to said drive gear; and a changeover mechanism including a pair of clutch sleeves each mounted on said first and second shafts respectively and shiftable between a first position where both said clutch sleeves are retained to connect said drive and driven gears to said first and second shafts respectively for rotation therewith, and a second position where both said clutch sleeves are retained to disconnect said drive and driven gears from said first and second shafts, respectively, wherein said drive and driven gears remain substantially stationary as said first and second shafts rotate.

2. A power transfer devie as claimed in claim 1 further comprising a synchronizer mechanism arranged to effect synchronous connection between said driven gear and said second shaft in shifting operation of said clutch sleeve on said second shaft toward the first position from the second position.

3. A power transfer device as claimed in claim 1, wherein said pair of clutch sleeves are operationally connected to each other.

4. A power transfer device as claimed in claim 3, wherein said pair of clutch sleeves are unitarily shiftable betwen said first and second positions.

5. A power transfer device adapted for use in combination with a power transmission for an automotive vehicle, comprising:

a housing;

an input shaft rotatably mounted within said housing for connection to an output shaft of said power transmission;

a first output shaft rotatably mounted within said housing coaxially with said input shaft, said first output shaft having an inner end rotatably coupled within said input shaft and having an output end for drive connection to a pair of rear-wheel or front-wheel axles;

a second output shaft rotatably mounted within said housing in parallel with said first output shaft and having an output end for drive connection to a pair of front-wheel or rear-wheel axles;

a drive member rotatably mounted on said first output shaft and connectable to said first output shaft;

a driven member rotatably mounted on said second output shaft and connectable to said second output shaft, said driven member being drivingly connected to said drive member;

a change-speed mechanism mounted on said input shaft and having an input element connected with said input shaft and an output element for providing a low speed drive power train;

a first changeover mechanism including a clutch sleeve mounted on said first output shaft between said changespeed mechanism and said drive member and shiftable between a first position wherein said clutch sleeve is retained to directly connect the input shaft to said first output shaft and a second position where said clutch sleeve is retained to connect the output element of said change-speed mechanism to said first output shaft; and a second changeover mechanism including a pair of second clutch sleeves each mounted on said first and second output shafts respectively and arranged adjacent said drive and driven members, said second clutch sleeves being shiftable between a first position where both said second clutch sleeves are retained to connect said drive and driven members to said first and second output shafts respectively for rotation therewith and a second position where both said second clutch sleeves are retained to disconnect said drive and driven members from said first and second output shafts respectively, wherein said drive and driven gears remain substantially stationary as said first and second shafts rotate.

6. A power transfer device as claimed in claim 5, wherein said change-speed mehanism is in the form of a planetary gear unit mounted on said input shaft and having an input element connected with said input shaft and an output element for providing a low speed drive power train, and wherein said clutch sleeve of said first changeover mechanism is retained in the first position to direectly connect said input shaft to said first output shaft and retained in the second position to disconnect said input shaft from said first output shaft and connect the output element of said planetary gear unit to said first output shaft.

7. A power transfer device as claimed in claim 6, wherein said planetary gear unit includes a sun gear mounted on said input shaft for rotation therewith, a stationary ring gear arranged concentrically with said sun gear, a carrier rotatably mounted on said input shaft, a planetary gear rotatably supported by said carrier and in mesh with said sun gear and said ring gear, and a side gear plate fixed to one end of said carrier for rotation therein, and wherein said clutch sleeve of said first changeover mechanism is retained in the first position to directly connect said input shaft to said first output shaft and retained in the second position to disconnect said input shaft from said first output shaft and connect said side gear plate to said first output shaft.

8. A power transfer device as claimed in claim 5, wherein said drive member is a drive sprocket rotatable on said first output shaft, and said driven member is a driven sprocket rotatable on said second output shaft and being drivingly connected to said drive sprocket by means of a drive chain.

9. A power transfer device as claimed in claim 5, further comprising a synchronizer mechanism arranged to effect synchronous connection between said driven member and said second output shaft in shifting operation of said second clutch sleeve on said second output shaft toward the first position from the second position.

10. A power transfer device as claimed in claim 5, wherein said pair of clutch sleeves are operatively connected to each other.

11. A power transfer device as claimed in claim 10, wherein said pair of clutch sleeves are unitarily shiftable between said first and second positions.

* * * * *

UNITED STATES PATENT AND TRADEMARK OFFICE
CERTIFICATE OF CORRECTION

PATENT NO. : 4,711,136
DATED : December 8, 1987
INVENTOR(S) : Toshio YOSHINAKA et al It is certified that error appears in the above-identified patent and that said Letters Patent is hereby corrected as shown below:

Column 7, line 19, insert "," after "claim 1";

line 30, change "betwen" to --between--;

line 60, change "changespeed" to --change-speed--;

line 61, change "wherein" to --where--;

Column 8, line 26, change "direectly" to --directly--;

line 39, change "therein" to --therewith--.

Signed and Sealed this

Second Day of August, 1988

*Attest:*

DONALD J. QUIGG

*Attesting Officer*

*Commissioner of Patents and Trademarks*